(12) United States Patent
Takagi

(10) Patent No.: US 8,187,739 B2
(45) Date of Patent: May 29, 2012

(54) POWER STORAGE APPARATUS AND COOLING SYSTEM

(75) Inventor: Masaru Takagi, Toyota (JP)

(73) Assignee: Toyota Jidosha Kabushiki Kaihsa, Toyota-shi (JP)

( * ) Notice: Subject to any disclaimer, the term of this patent is extended or adjusted under 35 U.S.C. 154(b) by 591 days.

(21) Appl. No.: 12/439,754

(22) PCT Filed: Oct. 23, 2007

(86) PCT No.: PCT/JP2007/070588
§ 371 (c)(1),
(2), (4) Date: Mar. 3, 2009

(87) PCT Pub. No.: WO2008/050736
PCT Pub. Date: May 2, 2008

(65) Prior Publication Data
US 2010/0062328 A1   Mar. 11, 2010

(30) Foreign Application Priority Data
Oct. 27, 2006  (JP) ................. 2006-291881

(51) Int. Cl.
*H01M 10/50* (2006.01)
(52) U.S. Cl. ........ 429/120; 429/104; 429/163; 429/199; 429/304; 429/325
(58) Field of Classification Search .......... 429/104, 429/163, 167, 168, 176, 304
See application file for complete search history.

(56) References Cited

U.S. PATENT DOCUMENTS

| | | | |
|---|---|---|---|
| 6,087,036 A | * | 7/2000 | Rouillard et al. ............... 429/66 |
| 2005/0126756 A1 | * | 6/2005 | Costello et al. ............... 165/80.4 |
| 2005/0175903 A1 | * | 8/2005 | Kim et al. ..................... 429/246 |

FOREIGN PATENT DOCUMENTS

| | | |
|---|---|---|
| JP | 8-96837 A | 4/1996 |
| JP | 08-096837 A | 4/1996 |
| JP | 10-241733 A | 9/1998 |
| JP | 11-26031 A | 1/1999 |
| JP | 2003-346924 * | 5/2002 |
| JP | 11-40211 A | 12/2003 |
| JP | 2003-346924 A | 12/2003 |

* cited by examiner

*Primary Examiner* — Patrick Ryan
*Assistant Examiner* — Ben Lewis
(74) *Attorney, Agent, or Firm* — Kenyon & Kenyon LLP

(57) ABSTRACT

To provide a power storage apparatus which can achieve improved heat radiation of a power storage unit, a power storage apparatus has a power storage unit including an electrode element placed with an electrolyte layer, and a case housing the power storage unit and a cooling fluid which is used for cooling the power storage unit and is in contact with at least the electrode element.

6 Claims, 3 Drawing Sheets

POWER STORAGE APPARATUS AND COOLING SYSTEM

This is a 371 national phase application of PCT/JP2007/070588 filed 23 Oct. 2007, claiming priority to Japanese Patent Application No. 2006-291881 filed 27 Oct. 2006, the contents of which are incorporated herein by reference.

TECHNICAL FIELD

The present invention relates to a power storage apparatus which houses in a case a power storage unit including an electrode element placed with a solid electrolyte layer and which allows improved efficiency of heat radiation of the power storage unit.

BACKGROUND ART

Power storage apparatuses such as a secondary battery and an electric double layer capacitor (condenser) have conventionally been used as batteries in hybrid vehicles and electric vehicles. In the power storage apparatuses, the battery performance may be reduced or the battery life may be shortened due to heat generation of the battery or the like in charge and discharge.

To address this, a proposal has been made in which a power storage apparatus is cooled by supplying air or the like for cooling to a case which houses the power storage apparatus. Another proposal is to fill a cooling fluid into a sealed container which houses an assembled battery including a plurality of connected battery cells or a sealed container which houses a plurality of batteries (for example, see Patent Documents 1 and 2).

Batteries (or battery cells) described in Patent Documents 1 and 2 have a structure in which a power generation element (including electrode elements and electrolyte layers) is covered with a case (made of laminated film, for example). The battery and the cooling fluid are housed in the sealed container. The cooling fluid is in contact with the case of the battery in the structure.

The case is typically sealed to prevent water or the like from entering the case. The case is filled with dry gas (for example, air or nitrogen gas) or the case is evacuated. The structure will be described with reference to FIG. 5.

In FIG. 5, a battery unit (power generation element) 100 including electrode elements and electrolyte layers is housed in a case 200. The battery unit 100 has a structure in which an electrode element for a positive electrode and an electrode element for a negative electrode are stacked with the electrolyte layer interposed therebetween. Each of the electrode elements has a collector and an electrode layer (positive electrode layer or negative electrode layer) formed on a surface of the collector.

In the cooling structures described in Patent Documents 1 and 2, the cooling fluid is in contact with the case 200 to radiate heat of the battery unit 100 (cool the battery unit 100) through the case 200.

[Patent Document 1] Japanese Patent Publication No. 11 (1999)-26031 (paragraph numbers 0031, 0034, 0035, and FIG. 1)

[Patent Document 2] Japanese Patent Publication No. 2003-346924 (paragraph numbers 0011 to 0013, and FIG. 1)

DISCLOSURE OF THE INVENTION

Problems to be Solved by the Invention

In the structure in which the case 200 is filled with the dry gas or the structure in which the case 200 is evacuated, however, heat generated in the battery unit 100 during charge and discharge may not be transferred efficiently to the case 200.

Thus, the cooling structures described in Patent Documents 1 and 2 in which the cooling fluid is in contact with the case 200 to radiate the heat of the case 200 can only achieve cooling of the case 200. In other words, most of the heat generated in the battery unit 100 remains within the case 200, and efficient heat radiation (cooling) of the battery unit 100 cannot be performed.

In the evacuated case 200, the collector or the like of the battery unit 100 may be bent during the evacuation processing to bring the adjacent collectors in the stacking direction into contact with each other (short-circuit the adjacent collectors).

It is thus an object of the present invention to provide a power storage apparatus which can achieve improved efficiency of cooling of a power storage unit serving as a power generation element.

Means for Solving Problems

A power storage apparatus according to a present invention comprises a power storage unit which includes electrode elements placed with a solid electrolyte layer, and a case which houses the power storage unit and a cooling fluid, the cooling fluid being used for cooling the power storage unit and being in contact with at least the electrode element.

For example, a fluorochemical inert fluid can be used as the cooling fluid. Specifically, Fluorinert, Novec HFE (hydrofluoroether), and Novec1230 (manufactured by 3M) can be used as the fluorochemical inert fluid, for example.

At least one of the solid electrolyte layer and the electrode element may be made of material containing sulfur or a sulfur compound. More specifically, it is possible to use polymer solid electrolyte or inorganic solid electrolyte as the solid electrolyte layer. The case may be made of laminated film.

For the electrode element, it is possible to use a bipolar electrode element which includes a collector, and a positive electrode layer and a negative electrode layer formed on the opposite surfaces of the collector.

A cooling system according to another invention comprises the power storage apparatus of the above described invention, and a cooling mechanism which is adapted to cool the case of the power storage apparatus.

The cooling mechanism is configured to bring (supply) a cooling medium into contact with the case to allow cooling of the case. Air for cooling or a fluid for cooling (for example, a fluorochemical inert fluid) can be used as the cooling medium.

Effects of the Invention

According to the present invention, the power storage unit and the cooling fluid are housed in the case and the cooling fluid is brought into contact with at least the electrode element, which enables efficient transfer of the heat generated in the power storage unit to the case through the cooling fluid to improve the heat radiation efficiency of the power storage unit.

BEST MODE FOR CARRYING OUT THE INVENTION

Preferred embodiments of the present invention will hereinafter be described.

[Embodiment 1]

Figure 1:
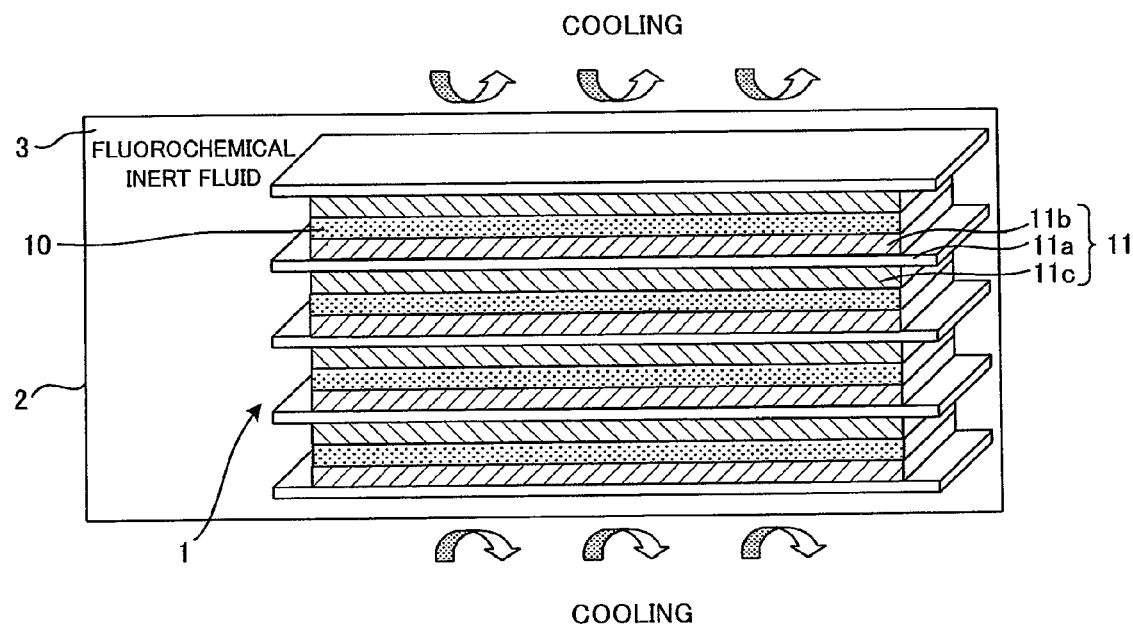
[FIG. 1] A side view showing the configuration of a power storage apparatus which is Embodiment 1 of the present invention.
Figure 2:
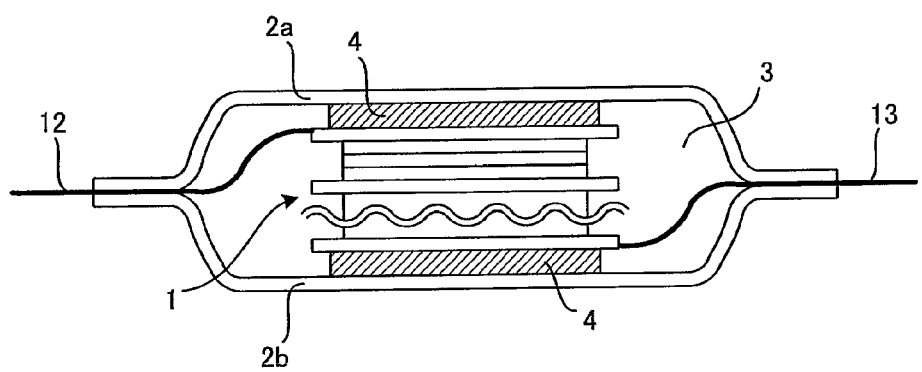
[FIG. 2] A section view showing the configuration of the power storage apparatus of Embodiment 1.
Figure 3:
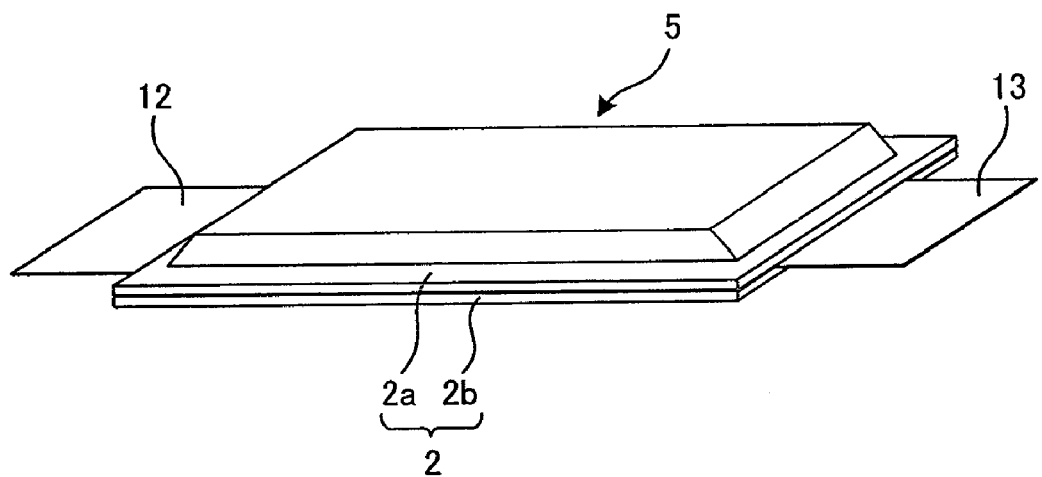
[FIG. 3] A perspective view showing the outer appearance of the power storage apparatus which is Embodiment 1.

A power storage apparatus which is Embodiment 1 of the present invention will be described with reference to FIGS. 1 to 3. FIG. 1 is a side view showing the schematic configuration of the power storage apparatus. FIG. 2 is a section view showing the internal configuration of the power storage apparatus. FIG. 3 is a perspective view showing the outer appearance of the power storage apparatus.

As shown in FIG. 1, a power storage unit 1 serving as a power generation element has a structure in which a plurality of electrode elements 11 are stacked with solid electrolyte layers 10 interposed therebetween. While a secondary battery is used as the power storage unit 1 in Embodiment 1, an electric double layer capacitor (condenser) may be used.

Each of the electrode elements 11 includes a collector 11a, a positive electrode layer 11b formed on one surface of the collector 11a, and a negative electrode layer 11c formed on the other surface (opposite to the one surface) of the collector 11a. In other words, each of the electrode elements 11 has a bipolar electrode structure.

Each of the electrode elements 11 placed at both ends of the power storage unit 11 in the stacking direction has the electrode layer (positive electrode layer or negative electrode layer) formed only on the one surface of the collector.

The positive electrode layer 11b and the negative electrode layer 11c contain active materials appropriate for the positive electrode and the negative electrode, respectively. Each of the positive electrode layer 11b and the negative electrode layer 11c also contains a conductive agent, a binder, an inorganic solid electrolyte for increasing ionic conduction, a polymer gel electrolyte, a polymer electrolyte, an additive or the like as required.

For example, a composite oxide of transition metal and lithium can be used as the active material of the positive electrode. Specifically, it is possible to use a Li/Co composite oxide such as $LiCoO_2$, a Li/Ni composite oxide such as $LiNiO_2$, a Li/Mn composite oxide such as spinel $LiMn_2O_4$, and a Li/Fe composite oxide such as $LiFeO_2$. It is also possible to use a phosphate compound of transition metal and lithium such as $LiFePO_4$ and a sulfate compound thereof, a transition metal oxide such as $V_2O_5$, $MnO_2$, $TiS_2$, $MoS_2$, $MoO_3$ or a sulfide thereof, $PbO_2$, AgO, and NiOOH. On the other hand, a metal oxide, a lithium-metal composite oxide, and carbon can be used as the active material of the negative electrode, for example.

While Embodiment 1 is described in conjunction with the use of the bipolar electrode element 11, the present invention is not limited thereto. For example, it is possible to use an electrode element in which positive electrode layers are formed on both surfaces of a collector and an electrode element in which negative electrode layers are formed on both surfaces of a collector. In this case, the electrode element having the positive electrode layers formed thereon and the electrode element having the negative electrode layers formed thereon are placed (stacked) alternately with the solid electrolyte layers interposed therebetween.

The collector 11a can be made of one type of metal foil or a so-called composite collector including a plurality of types of metal foil.

The solid electrolyte layer 10 can be made of a polymer solid electrolyte or an inorganic solid electrolyte. A known material can be used for the electrolyte.

It is possible to use polyethylene oxide (PEO), polypropylene oxide (PPO), and a copolymer thereof as the polymer solid electrolyte. The polymer solid electrolyte contains lithium salt for ensuring ion conduction. For example, $LiBF_4$, $LiPF_6$, $LiN(SO_2CF_3)_2$, $LiN(SO_2C_2F_5)_2$, or a mixture thereof can be used as the lithium salt.

In the power storage unit 1 having the abovementioned structure, a positive electrode terminal 12 and a negative electrode terminal 13 are electrically and mechanically connected to the electrode elements (positive electrode and negative electrode) placed at the both ends in the stacking direction (vertical direction in FIG. 1) as shown in FIG. 2.

The power storage unit 1 is covered with a case 2 which is formed of film members 2a and 2b made of laminated film. A cooling fluid 3 for use in cooling the power storage unit 1 is contained in the space formed between the case 2 and the power storage unit 1. In Embodiment 1, a fluorochemical inert fluid is used as the cooling fluid 3.

Typically, the laminated film can be made of polymer metal composite film having heat-fusible resin film, metal foil, and rigid resin film which are stacked in this order. The heat-fusible resin film is used as a seal for housing the power storage unit 1. The metal foil and the rigid resin film are used for providing wetness, airtightness, and chemical resistance.

The heat-fusible resin can be made of polyethylene or ethylenevinylacetate, for example. The metal foil can be made of aluminum foil or nickel foil, for example. The rigid resin can be made of polyethyleneterephthalate or nylon, for example.

On the other hand, serving as the fluorochemical inert fluid, it is possible to use Fluorinert, Novec HFE (hydrofluoroether), and Novec1230 manufactured by 3M. As the cooling fluid 3, a fluid other than the fluorochemical inert fluid may be used. Specifically, it is possible to use any fluid that can efficiently radiate heat generated in the power storage unit 1 (in other words, transfer the heat to the case 2), and for example, a silicone oil can be used.

As shown in FIG. 2, the case 2 holds the power storage unit 1 with a resin layer 4 interposed therebetween, and is heat-fused to provide sealing in the outer edge areas. The positive electrode terminal 12 and the negative electrode terminal 13 connected to the power storage unit 1 extend to the outside of the power storage apparatus 5 from the case 2. This allows the power generated in the power storage unit 1 to be taken out.

While Embodiment 1 is described in association with the use of the laminated film for the case 2, the present invention is not limited thereto. For example, a case made of metal can be used.

As described above, in the power storage apparatus 5 of Embodiment 1, the cooling fluid 3 is contained in the case 2 and is in contact with the power storage unit 1 and the case 2. Specifically, the cooling fluid 3 is in contact with the solid electrolyte layers 10 and the electrode elements 11 and also in contact with the inner surface of the case 2. In the configuration, the heat generated in the power storage unit 1 during charge and discharge is easily transferred to the case 2 through the cooling fluid 3 to enable improved efficiency of heat radiation of the power storage unit 1.

Specifically, the cooling fluid 3 can be naturally convected within the case 2 to transfer the heat generated in the power storage unit 1 to the case 2, thereby preventing an increase in temperature of the power storage unit 1.

The cooling fluid 3 contained in the case 2 can improve the heat capacity within the case 2 to preclude an abrupt increase in temperature of the power storage unit 1. In a vehicle or the like equipped with the power storage apparatus 5, charge and discharge of the power storage apparatus 5 should be stopped to ensure a high level of safety if the temperature is suddenly increased in the power storage apparatus 5 (power storage unit 1). Since the abrupt increase in temperature of the power storage apparatus 5 can be prevented in Embodiment 1, it is possible to take time for controlling the charge and discharge of the power storage apparatus 5 to enhance the safety.

To improve the heat radiation efficiency of the power storage unit 1, a fluid having a high thermal conductivity is preferably used as the cooling fluid 3. Since the cooling fluid 3 is in contact with the positive electrode terminal 12 and the negative electrode terminal 13 as shown in FIG. 2, it is preferable to use a fluid with electric insulation to avoid a short-circuit between the positive electrode terminal 12 and the negative electrode terminal 13. In addition, it is preferable to use a fluid which is not impregnated into the power storage unit 1 or the case 2.

In view of those considerations, the fluorochemical inert fluid can be preferably used as the cooling fluid 3.

Since the fluorochemical inert fluid has a lower solubility of water than other fluids, it can prevent the power storage unit 1 housed in the case 2 from coming into contact with water. In other words, it is possible to preclude deterioration of the members (such as the electrode elements 11 and the solid electrolyte layers 10) constituting the power storage unit 1 due to contact with water.

If the power storage unit 1 is made of any material containing sulfur or a sulfur compound, the sulfur atoms may react with water to produce hydrogen sulfide (gas). The use of fluorochemical inert fluid can prevent such a reaction between sulfur atoms and water and thus avoid the production of hydrogen sulfide.

Since the fluorochemical inert fluid has sufficient insulation as described above, it causes no decomposition or no deterioration even when it is in direct contact with the power storage unit 1.

When the fluorochemical inert fluid is used, it can also serve as an extinguisher and can ensure safety if the power storage apparatus 5 of Embodiment 1 is broken by external forces. Especially when Novec1230 is used as the fluorochemical inert fluid, an excellent extinguishing property can be provided.

In addition, the containment of the cooling fluid 3 in the case 2 can prevent bending of the collector 11a or the like of the power storage unit 1 as compared with the case where the case 2 is evacuated. This can preclude a short-circuit between the collectors 11a due to the contact of them.

In the power storage apparatus 5 of Embodiment 1, the outer surface of the case 2 may be cooled by using a cooling medium.

Specifically, the power storage apparatus 5 may be housed in a sealed container (not shown) and a fluid for cooling may be filled into the sealed container. The sealed container and the fluid for cooling correspond to the cooling mechanism described in claims. The fluid for cooling may be naturally convected in the sealed container. The fluid for cooling may be forcedly circulated by connecting a circulating path to the sealed container and using a pump provided on the circulating path, and the fluid for cooling (which exchanges heat with the power storage apparatus 5) may be cooled by a radiator provided on the circulating path.

The power storage apparatus 5 may also be cooled by providing a cooling mechanism which supplies air for cooling to the power storage apparatus 5. The cooling mechanism may be formed of a duct for directing air outside the power storage apparatus 5 into the power storage apparatus 5 and a fan provided on the duct.

The power storage apparatus 5 (case 2) can be cooled as described above to further improve the heat radiation efficiency of the power storage unit 1 placed inside the power storage apparatus 5.

Figure 4:
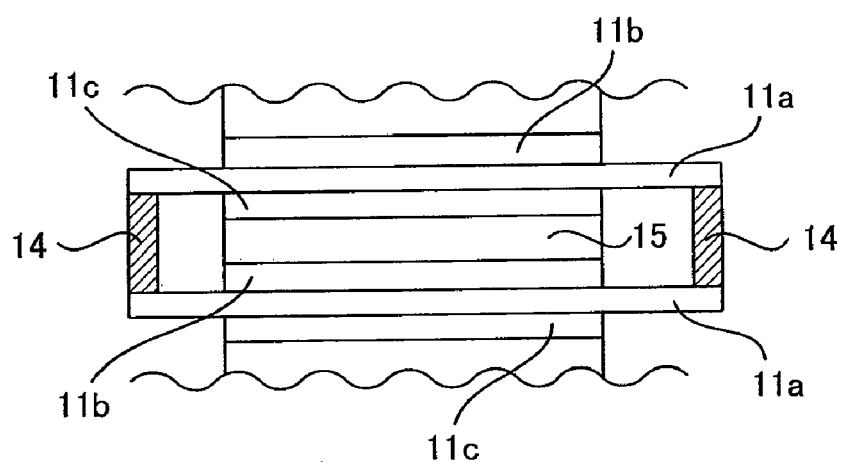
[FIG. 4] A diagram showing the configuration of part of a power storage apparatus which is a modification of Embodiment 1.
Figure 5:
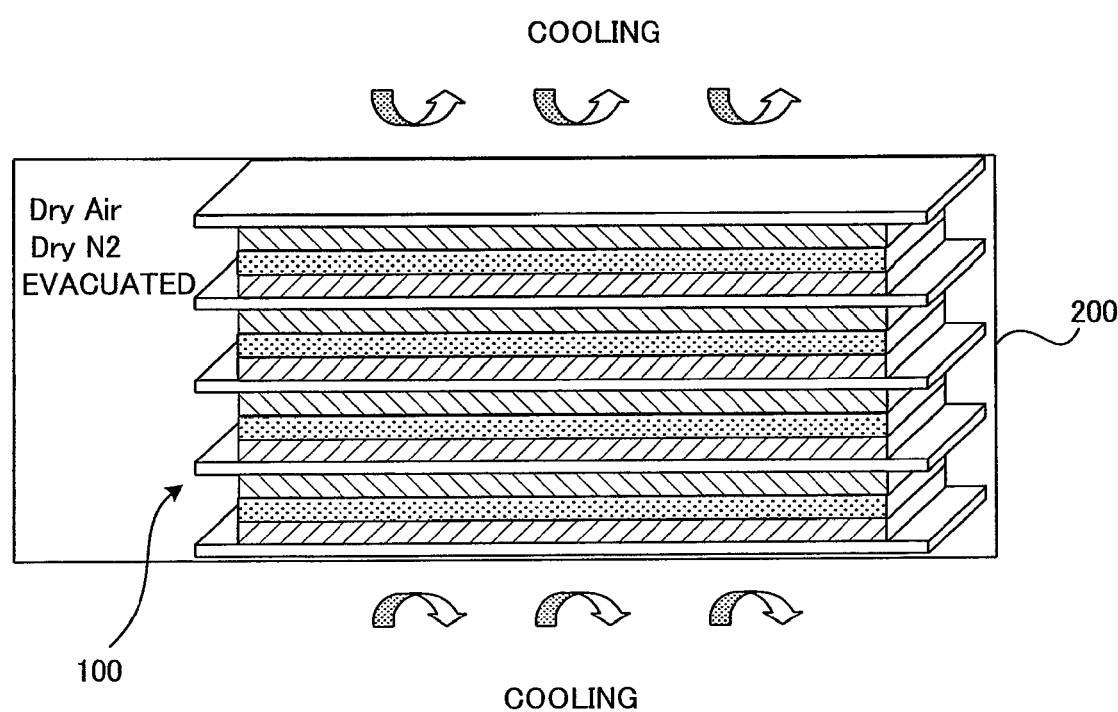
[FIG. 5] A side view showing the configuration of a conventional power storage apparatus.

While the power storage unit 1 of Embodiment 1 has been described in conjunction with the use of the solid electrolyte layers 10, the present invention is not limited thereto. Specifically, a gel or liquid electrolyte layer can be used. In this case, a seal material 14 can be placed between adjacent collectors 11a in the stacking direction as shown in FIG. 4. FIG. 4 is a schematic diagram showing the configuration of part of a power storage unit 1, in which members identical to those described in Embodiment 1 are designated with the same reference numerals.

As shown in FIG. 4, the seal material 14 is placed between the adjacent collectors 11a in the stacking direction along the outer edges of the collectors 11a to allow sealing of the space between the adjacent collectors 11a. The liquid or gel electrolyte layer 15 can be disposed in the sealed space. The seal material 14 can prevent leakage of any ingredient of the electrolyte layer 15 to the outside (into the cooling fluid 3) or entering of the cooling fluid 3 into the electrolyte layer 15. In this case, the cooling fluid 3 is in contact with the electrode element 11 (more specifically, the collectors 11a).

The seal material 14 is preferably made of an insulating material to prevent a short-circuit between the adjacent collectors 11a in the stacking direction. It is also preferable to use a material resistant to impregnation with the cooling fluid 3.

Examples of the gel electrolyte include an electrolytic solution for use in a lithium-ion battery held in a polymer backbone having ion conductivity or such an electrolytic solution held in a polymer backbone not having ion conductivity.

The electrolytic solution contained in the gel electrolyte can be any as long as it is typically used for a lithium-ion battery, for example. It is possible to use a solution which contains at least one type of lithium salt (electrolyte salt) selected from inorganic acid anion salt such as $LiPF_6$, $LiBF_4$, $LiClO_4$, $LiAsF_6$, $LiTaF_6$, $LiAlCl_4$, and $Li_2B_{10}Cl_{10}$, and organic acid anion salt such as $LiCF_3SO_3$, $Li(CF_3SO_2)_2N$, $Li(C_2F_5SO_2)_2N$, or a mixture thereof, mixed with at least one or two or more types selected from cyclic carbonates such as propylene carbonate and ethylene carbonate; chain carbonates such as dimethyl carbonate, methyl ethyl carbonate, and diethyl carbonate; ethers such as tetrahydrofuran, 2-methyltetrahydrofuran, 1,4-dioxane, 1,2-dimethoxyethane, and 1,2-dibutoxyethane; lactones such as γ-butyrolactone; nitriles such as acetonitrile; esters such as methyl propionate; amides such as dimethylformamide; methyl acetate; and methyl formate, in which a non-protonic organic solvent (plasticizer) is used.

For the abovementioned lithium salt, it is possible to use inorganic acid anion salt such as $LiPF_6$, $LiBF_4$, $LiClO_4$, $LiAsF_6$, $LiTaF_6$, $LiAlCl_4$, and $Li_2B_{10}Cl_{10}$, and organic acid anion salt such as $Li(CF_3SO_2)_2N$ and $Li(C_2F_5SO_2)_2N$, or a mixture thereof, for example.

On the other hand, the power storage unit 1 of Embodiment 1 has the structure in which the plurality of electrode elements 11 are stacked with the solid electrolyte layers 10 interposed therebetween, the present invention is not limited thereto. For example, the power storage unit can be formed by winding a single elongated electrode element.

In this case, the electrolyte layers are placed on the wound electrode element. A case may be provided which has a shape (specifically, a cylindrical shape) capable of housing the power storage unit including the wound electrode element, and the case may be filled with a fluid for cooling (for example, a fluorochemical inert fluid).

The power storage apparatus of Embodiment 1 can be used as the power storage apparatus for driving a motor in an electric vehicle (EV), a hybrid electric vehicle (HEV), and a fuel-cell electric vehicle (FCV), for example. For mounting the power storage apparatus of Embodiment 1 on an electric vehicle, a plurality of power storage apparatuses of Embodiment 1 are provided and electrically connected in series for use to provide sufficient output for driving a motor.

The invention claimed is:

1. A power storage apparatus comprising:
a power storage unit which includes an electrode element placed with a solid electrolyte layer; and
a case forming an inner space which internally houses the power storage unit and a cooling fluid therein, the cooling fluid being used for cooling the power storage unit and being in direct contact with at least the electrode element.

2. The power storage apparatus according to claim 1, wherein the cooling fluid is a fluorochemical inert fluid.

3. The power storage apparatus according to claim 1, wherein at least one of the solid electrolyte layer and the electrode element contains sulfur or a sulfur compound.

4. The power storage apparatus according to claim 1, wherein the case is made of laminated film.

5. A cooling system comprising:
the power storage apparatus according to claim 1; and
a cooling mechanism which is adapted to cool the case of the power storage apparatus.

6. A power storage apparatus comprising:
a power storage unit which includes an electrode element placed with a solid electrolyte layer; and
a case forming an inner space which internally houses the power storage unit and a cooling fluid therein, the cooling fluid being used for cooling the power storage unit and being in direct contact with at least the electrode element,
wherein the case holds the power storage unit with a resin layer interposed therebetween.

* * * * *

UNITED STATES PATENT AND TRADEMARK OFFICE
CERTIFICATE OF CORRECTION

PATENT NO.        : 8,187,739 B2
APPLICATION NO.   : 12/439754
DATED             : May 29, 2012
INVENTOR(S)       : Masaru Takagi Page 1 of 1

It is certified that error appears in the above-identified patent and that said Letters Patent is hereby corrected as shown below:

In the Title Page, Column 1:

Replace "(73)    Assignee:    Toyota Jidosha Kabushiki Kaihsa," with

--(73)    Assignee:    Toyota Jidosha Kabushiki Kaisha,--.

Signed and Sealed this
Eighteenth Day of December, 2012

David J. Kappos
*Director of the United States Patent and Trademark Office*